(12) United States Patent
Smith

(10) Patent No.: US 6,377,403 B1
(45) Date of Patent: Apr. 23, 2002

(54) SHORT PULSE LASER PROTECTION FLY'S EYE LENS

(76) Inventor: David C. Smith, 44 Candlelight Dr., Glastonbury, CT (US) 06033

( * ) Notice: Subject to any disclaimer, the term of this patent is extended or adjusted under 35 U.S.C. 154(b) by 0 days.

(21) Appl. No.: 09/656,786

(22) Filed: Sep. 7, 2000

(51) Int. Cl.[7] ............ G02B 3/12; G02B 27/30; G02B 27/10
(52) U.S. Cl. ............ 359/667; 359/665; 359/641; 359/619
(58) Field of Search ............... 359/619, 620, 359/625, 626, 665, 667, 641

(56) References Cited

U.S. PATENT DOCUMENTS

| | | | | |
|---|---|---|---|---|
| 3,532,038 A | * | 10/1970 | Rottmann | 359/619 |
| 3,600,063 A | * | 8/1971 | Bowen | 359/626 |
| 5,384,657 A | * | 1/1995 | Robb | 359/665 |
| 5,615,048 A | * | 3/1997 | Davies | 359/622 |
| 5,644,431 A | * | 7/1997 | Magee | 359/619 |
| 5,831,769 A | * | 11/1998 | Smith | 359/634 |
| 6,028,723 A | * | 2/2000 | Smith | 359/885 |

* cited by examiner

Primary Examiner—Ricky Mack
Assistant Examiner—Gary O'Neill
(74) Attorney, Agent, or Firm—M. P. Williams

(57) ABSTRACT

A lens array (7) has a plurality of frusto-spherical convex lenses (14, 15), formed in an optical entry surface (8) and an optical exit surface (9), focusing light rays (18, 19) near the center between each lens pair (14a, 15a) in an area (20) where the laser energy is focused sufficiently to induce vaporization resulting in aerosol breakdown which will absorb 99% or more of the laser energy, and thereby protect high gains optical equipment or eyes from optical damage.

**9 Claims,

SHORT PULSE LASER PROTECTION FLY'S EYE LENS

TECHNICAL FIELD

This invention relates to a protective lens array in which particle induced gas breakdown absorbs laser power.

1. Background Art

U.S. Pat. No. 6,028,732 discloses a lens for protecting high gain optical systems (eyes or equipment) from laser radiation pulses of about one microsecond duration and less. One embodiment comprises a normal binocular system which focuses the radiation at a central point so as to vaporize an aerosol particle, thereby to induce an avalanche of ionization, commonly known as gas breakdown, as reported by Smith, David C., "Gas Breakdown Initiated by Laser Radiation Interaction with Aerosols and Solid Surfaces", J. of Applied Physics, June 1977, p. 2217. The binocular system may comprise a solid lens material such as glass or carbonate, having entry and exit binocular lenses formed at the ends thereof, the solid being laden with aerosol particles.

A problem with that invention is that the ratio of the aperture to the thickness of the lens implies either an extremely thick lens (on the order of several inches thick), or an f number which is difficult or impossible to practically achieve (being on the order of less than 1.2).

2. Disclosure of Invention

Objects of the invention include provision of a simple, low-cost lens for protecting against short pulse laser radiation; a short pulse laser radiation lens being capable of implementation with f numbers higher than f-2; and a practical, effective lens for protecting against short pulse laser radiation.

According to the present invention, a lens array having a plurality of individual lenses combined into a single structure is laden with particulates, such as carbon, or other absorption materials which will readily ionize when radiated by concentrated laser irradiation. According to the invention in one form, a solid plastic or glass lens has a fly's eye lens surface on both the entry side and the exit side, thereby comprising a plurality of individual lenses, each of which has a very small aperture so that the thickness of the lens array can be just over twice the aperture dimension, thereby providing a compact and practical short pulse laser protection lens assembly.

Other objects, features and advantages of the present invention will become more apparent in the light of the following detailed description of exemplary embodiments thereof, as illustrated in the accompanying drawing.

MODE(S) FOR CARRYING OUT THE INVENTION

The concept of the aforementioned patent is to focus the incoming laser radiation with sufficient magnification to increase the laser pulse energy to a high enough level so as to generate a laser induced aerosol breakdown which will absorb 99% or more of the laser energy and thereby protect the high gain optical system (eyes or equipment) from optical damage. The breakdown phenomenon results from a free electron accelerated by the laser radiation field, which gains sufficient energy to ionize an atom upon collision. This then becomes two electrons, and if the laser intensity is sufficiently high, leads to full ionization and, therefore, breakdown.

Figure 1:
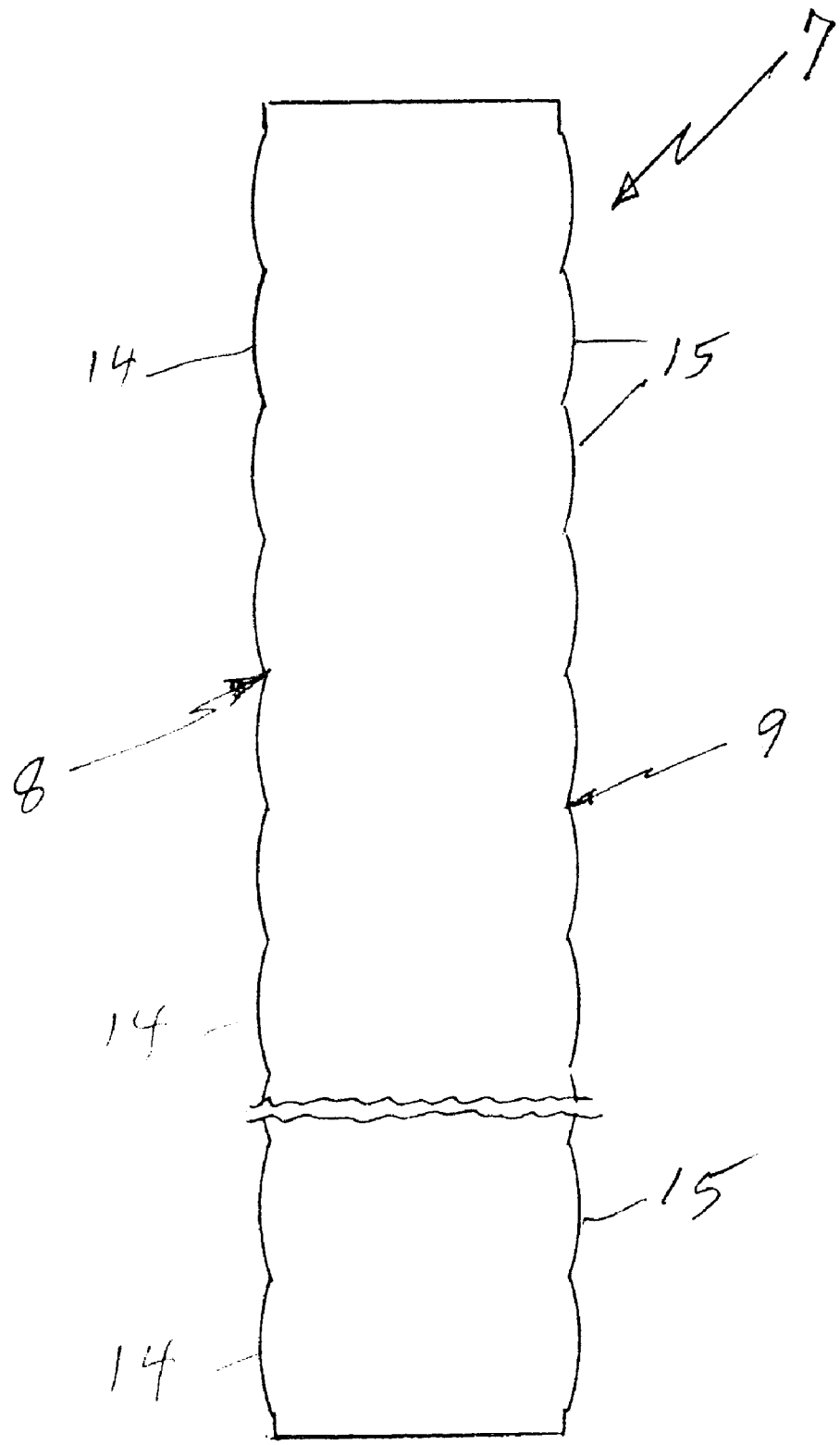
FIG. 1 is partially broken away, sectioned side elevation view of a lens array according to the invention, with sectioning lines omitted for clarity.
Figure 2:
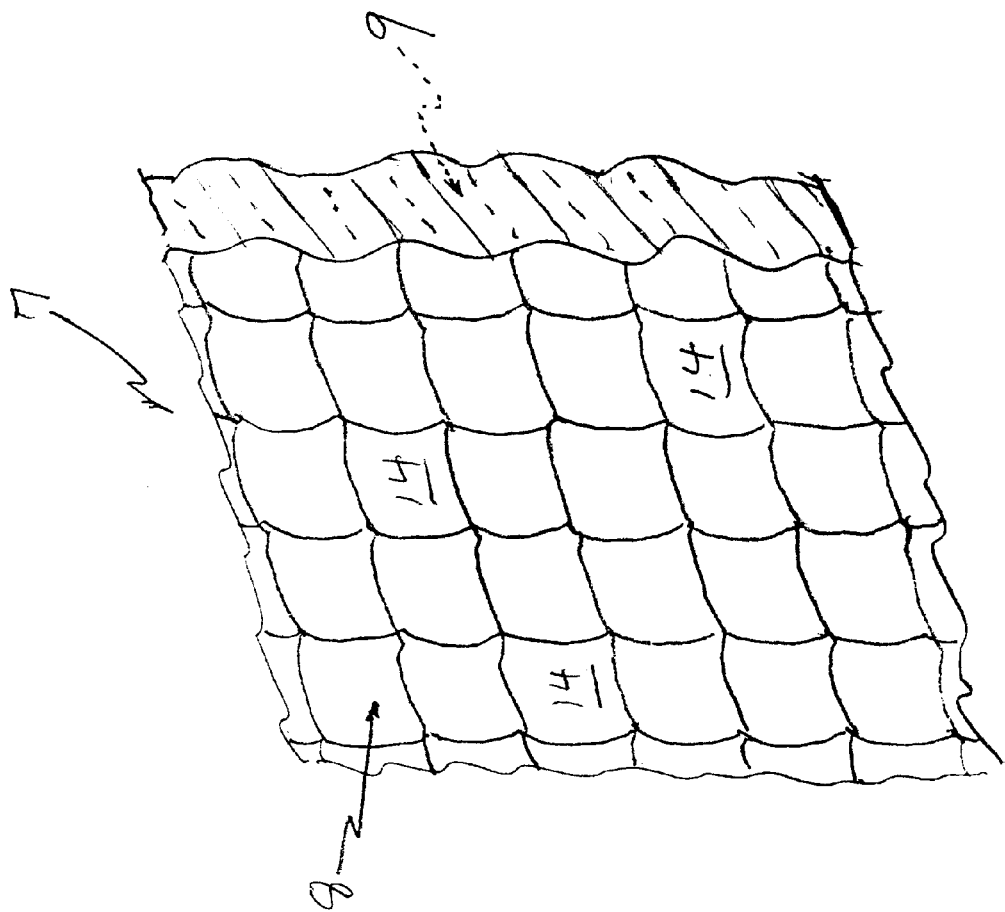
FIG. 2 is a fragmentary perspective view of the array of FIG. 1.

Referring to FIGS. 1 and 2, a lens array 7 in accordance with the invention has an optical entry surface 8 and an optical exit surface 9, each surface having formed therein a plurality of frusto-spherical, convex lenses 14, 15 formed therein.

Figure 3:
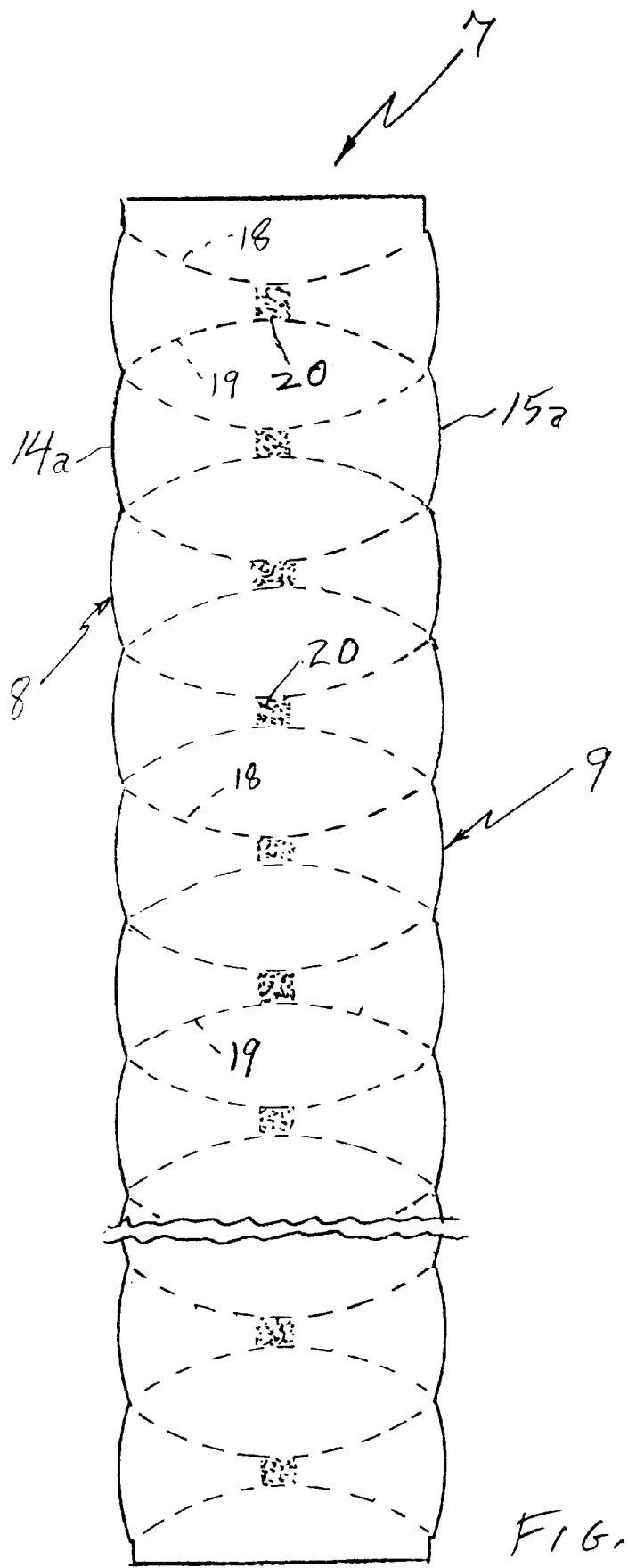
FIG. 3 is a schematic, side elevation view of the lens of FIG. 1, illustrating convergence and divergence of light rays within the individual lenses as well as the region where laser energy is focused sufficiently so as to induce vaporization of an aerosol particle, with sectioning lines omitted for clarity.
Figure 5:
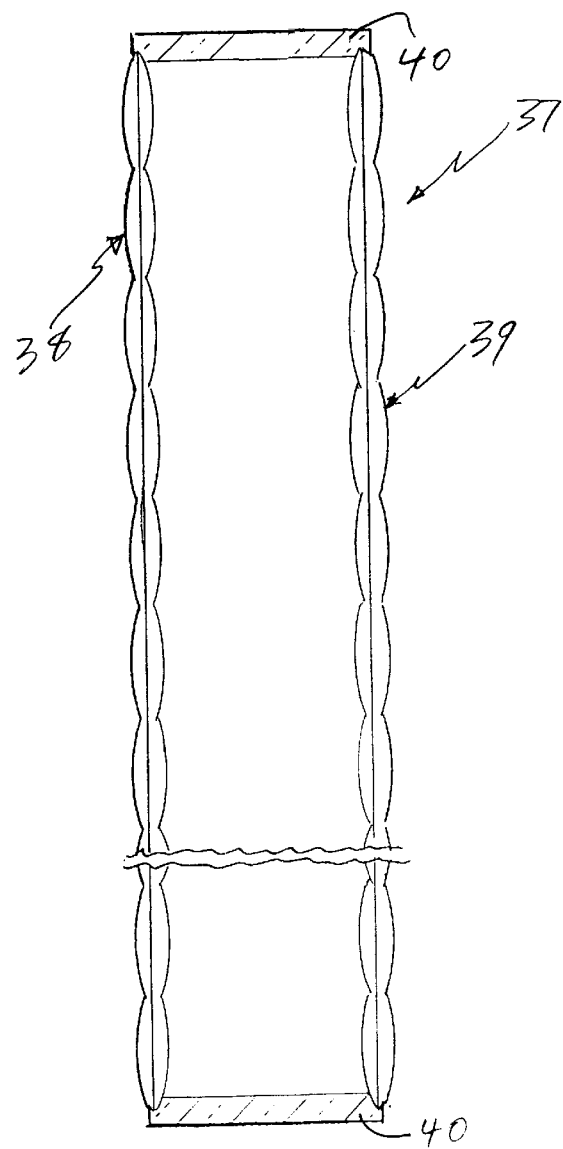
FIG. 5 is a partially broken away, sectioned side elevation view of a hollow lens array according to the invention.

As illustrated in FIG. 3, each pair of optical entry lens 14a and optical exit lens 15a correspond to the structure 9b in FIG. 7 of the aforementioned patent. That is, each lens 14a is a focusing lens and each lens 15a is a collimating lens. The light rays, represented by the lines 18, 19 are focused near the optical center of the lens pair, where the stippling illustrates those particles in an area 20 at which the laser energy is focused sufficiently to induce vaporization of at least one aerosol particle. If the laser intensity is sufficiently high so as to otherwise damage an optical system (eyes or equipment), the ionization will continue to full ionization, breakdown, and absorption of nearly all of the incoming laser energy, as is described more fully in the aforementioned patent. Whenever the intensity is below the breakdown threshold, the optical system does not impact the transmitted beam significantly; that is, within an included angle on the order of 20° or less, vision will be substantially unimpeded.

Figure 4:
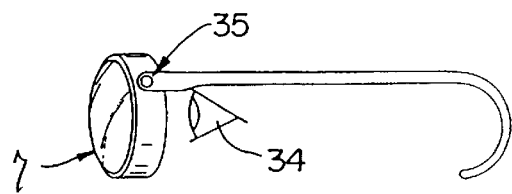
FIG. 4 is a partial, side elevation view of an eye and eyeglass employing the invention.

As shown in FIG. 4, eyeglasses 35 employing a lens array 7 may protect an eye 34.

The embodiment of the invention described with respect to FIGS. 1–3 is formed of a solid, such as glass or polycarbonate, with a suitable suspension of carbon particles, such as on the order of three microns in size. This apparatus can only be used one time to protect an optical system since the process is irreversible, because a breakdown induced in the solid produces permanent damage to the solid that exceeds the size of the aerosol by many orders of magnitude. Therefore, the invention may be practiced utilizing a hollow lens array containing aerosol particles suspended within air or water, or other gas or liquid, as shown in FIG. 4. Therein, the hollow lens array 37 includes an entry array 38 and an exit array 39, both supported by and sealed to a tubular body 40, which may be cylindrical or any other shape, such as the shape shown in FIG. 4. The hollow lens array has an outward appearance similar to that in FIGS. 1–3, and resembles a plurality of the embodiment shown in FIG. 6 of the aforementioned patent.

The lens array of the present invention may, if desired, be used in an overall system which also incorporates the invention of U.S. Pat. No. 5,831,769, and improvements thereto, to provide protection from laser pulses of greater than about one millisecond. That invention provides a cell with a serpentine interface between media which have indices of refraction different from each other when subjected to intensity laser radiation, to defocus the light. In that way, protection from the first microsecond of laser radiation may be provided by this invention, and protection from radiation subsequent to one microsecond, and steady state, may be provided by the invention of U.S. Pat. No. 5,831,769, or its improvements.

The aforementioned patents are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A lens array for protecting high gain optical systems from damage due to high intensity laser radiation, comprising:

a structure formed of lens material;

a plurality of collimating exit lenses formed in a first surface of said structure, each having an optical axis;

a plurality of focusing entry lenses formed in a second surface of said structure opposite to said first surface, each of said entry lenses having an optical axis which is coaxial with the optical axis of a corresponding one of said exit lenses, each of said entry lenses focusing incoming radiation onto a spot, radiation directed through said spot being collimated through the corresponding one of said exit lenses; and aerosol particles disposed between said first and second surfaces, whereby laser radiation focused at each of said spots vaporizes at least some of said particles.

2. A lens array according to claim 1 wherein said lens material includes glass.

3. A lens array according to claim 1 wherein said lens material includes polycarbonate.

4. A lens array according to claim 1 wherein said lens material includes carbon particles.

5. A lens array according to claim 1 wherein said high gain optical system is a human eye and said lens array is part of a pair of protective eyeglasses.

6. A lens array according to claim 1 wherein said lens array is a solid with aerosol particles dispersed therein.

7. A lens array according to claim 6 wherein said lens array is formed of polycarbonate.

8. A lens array according to claim 6 wherein said lens array is formed of glass.

9. A lens array according to claim 1 wherein said lens array is hollow and contains aerosol particles suspended in either (a) a gas or (b) a liquid.

* * * * *